(12) United States Patent
Morton et al.

(10) Patent No.: US 12,492,711 B1
(45) Date of Patent: Dec. 9, 2025

(54) OPEN ROTOR WITH FIXED GUIDE VANE/STATOR

(71) Applicant: RTX Corporation, Farmington, CT (US)

(72) Inventors: Jeffrey T. Morton, Manchester, CT (US); Andrew J. Murphy, Old Saybrook, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/758,112

(22) Filed: Jun. 28, 2024

(51) Int. Cl.
| | |
|---|---|
| *F04D 29/56* | (2006.01) |
| *F01D 7/00* | (2006.01) |
| *F04D 19/00* | (2006.01) |
| *F04D 29/54* | (2006.01) |
| *B64C 11/06* | (2006.01) |
| *B64C 11/08* | (2006.01) |

(Continued)

(52) U.S. Cl.
CPC ............ *F04D 29/563* (2013.01); *F01D 7/00* (2013.01); *F04D 19/002* (2013.01); *F04D 29/542* (2013.01); *B64C 11/065* (2013.01); *B64C 11/08* (2013.01); *F01D 17/16* (2013.01); *F01D 17/162* (2013.01); *F02C 6/206* (2013.01); *F02C 9/58* (2013.01); *F04D 27/002* (2013.01); *F05D 2220/324* (2013.01); *F05D 2220/325* (2013.01); *F05D 2230/80* (2013.01); *F05D 2260/961* (2013.01)

(58) Field of Classification Search
CPC .... F04D 29/563; F04D 27/002; F04D 29/542; F04D 19/002; F01D 17/16; F01D 17/162; F01D 7/00; F05D 2220/324; F05D 2220/325; F05D 2230/80; F05D 2260/961; B64C 11/08; B64C 11/065; F02C 6/206; F02C 9/58
See application file for complete search history.

(56) References Cited

U.S. PATENT DOCUMENTS 3,209,537 A * 10/1965 Mock .................... F01D 17/141
415/150
9,771,878 B2 9/2017 Lu et al.
(Continued)

FOREIGN PATENT DOCUMENTS

| CN | 111664110 A | * | 9/2020 | ........... F04D 27/001 |
|---|---|---|---|---|
| FR | 3108670 A1 | | 10/2021 | |
| FR | 3137410 A1 | | 1/2024 | |

OTHER PUBLICATIONS

European Search Report dated Sep. 8, 2025, in connection with European Patent Application No. 25186052.4, 12 pages.

*Primary Examiner* — Nathaniel E Wiehe
*Assistant Examiner* — Art Golik

(57) ABSTRACT

An assembly for an aircraft propulsion system includes an open propulsor rotor having variable geometry propulsor blades and an open guide vane/stator assembly having a plurality of guide vanes (stator blades) in a fixed position relative to the rotor and assembly. The geometry (e.g., pitch, camber, etc.) of the guide vanes can be manually adjusted by ground personnel but are incapable of adjustment during a flight mission (a flight). The open propulsor rotor is configured to rotate about an axis, and the guide vane assembly includes the plurality of guide vanes arranged circumferentially about the axis and is disposed axially next to and downstream of the propulsor rotor.

11 Claims, 3 Drawing Sheets

(51) Int. Cl.
    *F01D 17/16*     (2006.01)
    *F02C 6/20*     (2006.01)
    *F02C 9/58*     (2006.01)
    *F04D 27/00*     (2006.01)

(56) References Cited

U.S. PATENT DOCUMENTS

| | | | |
|---|---|---|---|
| 11,454,195 B2* | 9/2022 | Niergarth | F02K 3/02 |
| 11,834,196 B2 | 12/2023 | Adibhatla et al. | |
| 2021/0108575 A1* | 4/2021 | Adibhatla | F02K 1/76 |

* cited by examiner

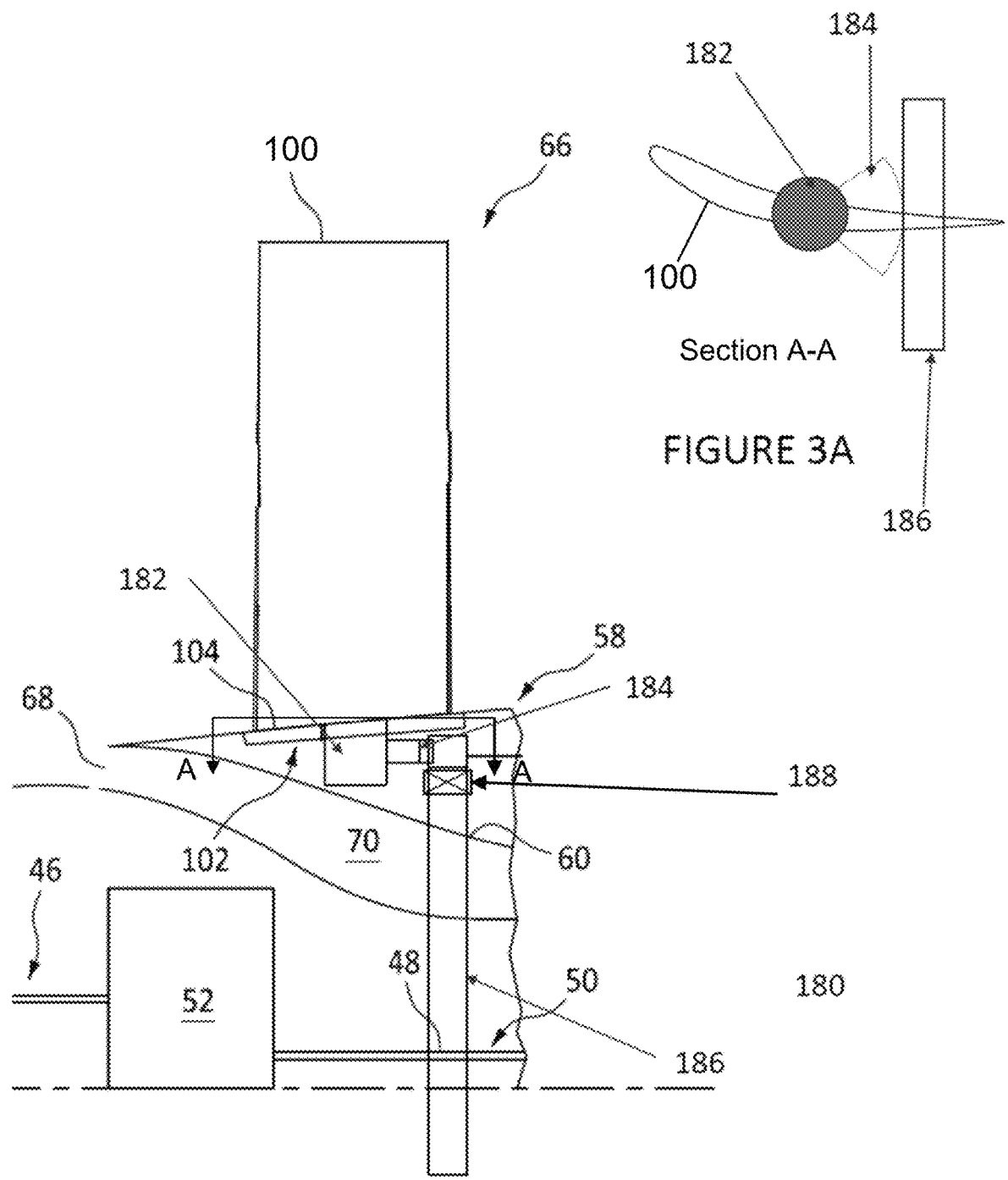

OPEN ROTOR WITH FIXED GUIDE VANE/STATOR

TECHNICAL FIELD

This disclosure relates generally to an aircraft and, more particularly, to an open rotor and guide vane/stator structure for an aircraft propulsion system.

BACKGROUND

An aircraft propulsion system may include a guide vane/stator structure arranged downstream of a propulsor rotor to condition air propelled by the propulsor rotor. Three main open rotor architectures have been considered in the industry, including single rotor (SR), single rotor plus vane/stator (SRV) and counter rotating open rotor (CROR). SRV open rotor configurations typically utilize variable pitch rotor blades to allow for a range of thrust levels (including reverse thrust) over a relatively small rotation speed range. This variability results in varying amounts of swirl downstream to the rotor. To increase efficiency and performance, variable geometry/pitch stators (also referred to as guide vanes) are incorporated downstream of the rotor to convert this swirl to thrust during operation/flight. However, to achieve this increase in performance, variable geometry/pitch mechanisms and actuation systems must be added, which increases complexity and weight.

SUMMARY

This disclosure provides apparatus and assemblies for an aircraft propulsion system.

In some examples, there is provided an assembly for an aircraft propulsion system. The assembly includes a propulsor rotor configured to rotate about an axis and a guide vane structure disposed axially next to and downstream of the propulsor rotor. The guide vane structure includes a plurality of guide vanes arranged circumferentially about the axis, and the plurality of guide vanes includes a first guide vane configured in a first geometry and fixed during a flight.

Any single one or any combination of the following features may be used with the above examples. The first guide vane may be further configured to be manually adjustable between the first geometry and a second geometry by ground personnel. the first guide vane is further configured to be manually adjustable between the first geometry and a second geometry. Each of the plurality of guide vanes may be configured in a first geometry and non-adjustable during the flight and further configured to be manually adjustable between the first geometry and a second geometry by ground personnel. The first geometry and the second geometry may comprise at least a one of pitch angle and camber. The first guide vane may be manually adjustable between the first geometry and the second geometry by replacing the first guide vane with the first geometry with a second guide vane having the second geometry. A lock mechanism may be coupled to the first guide vane and configured to prevent adjustment of the first guide vane when in a locked position and enable adjustment of the first guide vane when in an unlocked position. Each of the plurality of guide vanes may have a pitch angle and one or more of the pitch angles is configured to be adjustable only by ground personnel. A manually activated variable geometry adjustment structure may be coupled to the plurality of guide vanes and configured to vary a geometry of each of the plurality of guide vanes only when the assembly is stationary. A variable geometry adjustment structure may be coupled to the plurality of guide vanes and configured to be incapable of varying a geometry of the plurality of guide vanes during a flight.

In other examples, there is provided an assembly for an aircraft propulsion system having a propulsor rotor configured to rotate about an axis and a guide vane structure disposed axially next to and downstream of the propulsor rotor. The guide vane structure includes a plurality of guide vanes arranged circumferentially about the axis, and each of the plurality of guide vanes is configurable into a first fixed geometry and immovable during a full duration of a first flight and into a second fixed geometry and immovable during a full duration of a second flight.

Any single one or any combination of the following features may be used with the above examples. Each of the plurality of guide vanes may be manually adjustable between the first fixed geometry and the second fixed geometry by ground personnel. Each of the plurality of guide vanes may be configurable in the first fixed geometry and non-adjustable during the first flight and further configured to be manually adjustable between the first fixed geometry and the second fixed geometry only by ground personnel. The propulsor rotor may comprise an open propulsor rotor and comprises a plurality of variable pitch rotor blades and the guide vane structure comprises an open guide vane structure. The first fixed geometry and the second fixed geometry may comprise at least a one of pitch angle and camber. Each of the plurality of guide vanes may be manually adjustable between the first fixed geometry and the second fixed geometry by replacing one of the plurality of guide vanes having the first fixed geometry with another one of a second plurality of guide vanes having the second fixed geometry. A manually activated variable geometry adjustment structure may be coupled to the plurality of guide vanes and configured to vary a geometry of each of the plurality of guide vanes only when the assembly is stationary. A variable geometry adjustment structure may be coupled to the plurality of guide vanes and configured to be incapable of varying a geometry of the plurality of guide vanes during a flight.

In still other examples, there is provided an assembly for an aircraft propulsion system having a propulsor rotor configured to rotate about an axis and including a plurality of rotor blades each configured to vary a pitch of the rotor blade. A guide vane structure is disposed axially next to and downstream of the propulsor rotor and includes a plurality of guide vanes arranged circumferentially about the axis. Each of the plurality of guide vanes is configured to have a fixed pitch angle incapable of adjustment during a full duration of a flight.

Any single one or any combination of the following features may be used with the above examples. The fixed geometry of each of the plurality of guide vanes may be manually adjustable only by ground personnel. A manually activated variable geometry adjustment structure may be coupled to the plurality of guide vanes and configured to vary a geometry of each of the plurality of guide vanes, the propulsor rotor may comprise an open propulsor rotor, and the guide vane structure may comprise an open guide vane structure.

In some examples, there is provided a method of adjusting a guide vane structure in an aircraft propulsion system wherein the guide vane structure is disposed axially next to and downstream of a propulsor rotor and includes a plurality of guide vanes each having a first fixed geometry incapable of adjustment during flight. The method includes adjusting at least one of the plurality of guide vanes from the first fixed geometry to a second fixed geometry.

Any single one or any combination of the following features may be used with the above examples. The method may include manually adjusting, by ground personnel, each of the plurality of guide vanes from the first fixed geometry to a second fixed geometry. The aircraft propulsion system may further include an open propulsor rotor and the guide vane structure may be an open guide vane structure, and the method may further include manually activating a variable geometry adjustment structure coupled to the plurality of guide vanes to adjust each of the plurality of guide vanes from the first fixed geometry to the second fixed geometry.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 3 illustrates a close-up partial schematic illustration or block diagram of the aircraft propulsion system at the propulsion section illustrating a variable geometry adjustment structure; and FIG. 3A is a section view along A-A of FIG. 3.

DETAILED DESCRIPTION

FIGS. 1 through 3A, discussed below, and the various embodiments used to describe the principles of this disclosure in this patent document are by way of illustration only and should not be construed in any way to limit the scope of the disclosure. Those skilled in the art will understand that the principles of this disclosure may be implemented for any suitably arranged engine.

Figure 1:
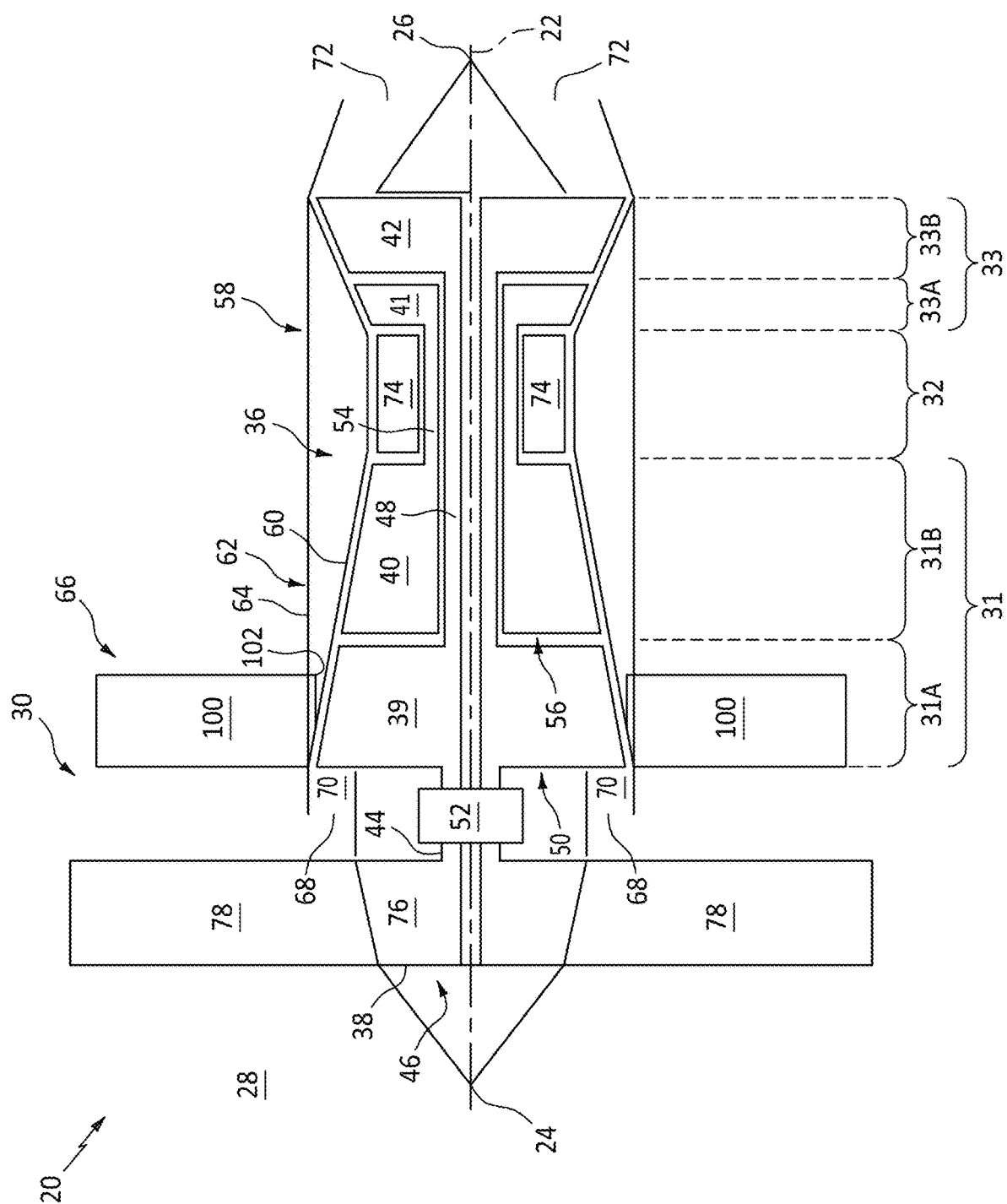
FIG. 1 illustrates a side schematic illustration or block diagram of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 extends axially along an axis 22 between a forward, upstream end 24 of the aircraft propulsion system 20 and an aft, downstream end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20.

The aircraft propulsion system 20 is configured as an open rotor propulsion system; e.g., a single rotor and stator vane (SRV) open rotor propulsion system. Here, the term "open" may describe a propulsion system section and/or a propulsion system component which is open to an environment 28 (e.g., an ambient environment) external to the aircraft propulsion system 20 and, more generally, the aircraft. The aircraft propulsion system 20, for example, includes an open propulsion section 30, a compressor section 31, a combustor section 32 and a turbine section 33. The compressor section 31 is shown including a low pressure compressor (LPC) section 31A and a high pressure compressor (HPC) section 31B. The turbine section 33 includes a high pressure turbine (HPT) section 33A and a low pressure turbine (LPT) section 33B. At least (or only) the LPC section 31A, the HPC section 31B, the combustor section 32, the HPT section 33A and the LPT section 33B collectively form a gas generator 36; e.g., a turbine engine core.

The propulsion section 30 includes a propulsor rotor 38 having multiple blades. The propulsor rotor 38 is shown configured as an open rotor (e.g., an un-ducted rotor) which projects radially into and is exposed to the external environment 28. The LPC section 31A includes a low pressure compressor (LPC) rotor 39. The HPC section 31B includes a high pressure compressor (HPC) rotor 40. The HPT section 33A includes a high pressure turbine (HPT) rotor 41. The LPT section 33B includes a low pressure turbine (LPT) rotor 42. Each of the bladed rotors 39-42 in FIG. 1 is configured as a ducted rotor internal within the aircraft propulsion system 20 and outside of the external environment 28.

The propulsor rotor 38 is connected or coupled to a propulsor shaft 44. At least (or only) the propulsor rotor 38 and the propulsor shaft 44 collectively form a propulsor rotating assembly 46. This propulsor rotating assembly 46 of FIG. 1 and its members 38 and 44 are rotatable about the axis 22.

As further illustrated in FIG. 1, the LPC rotor 39 is coupled to and rotatable with the LPT rotor 42, and the LPC rotor 39 is coupled or connected to the LPT rotor 42 through a low speed shaft 48. At least (or only) the LPC rotor 39, the LPT rotor 42 and the low speed shaft 48 collectively form a low speed rotating assembly 50; e.g., a low speed spool of the gas generator 36. This low speed rotating assembly 50 and its members 39, 42 and 48 are rotatable about the axis 22; however, it is contemplated the low speed rotating assembly 50 may alternatively be rotatable about another axis radially and/or angularly offset from the axis 22. The low speed rotating assembly 50 is also coupled to the propulsor rotating assembly 46. The low speed rotating assembly 50, for example, is connected to the propulsor rotating assembly 46 through a geartrain 52; e.g., an epicyclic gear system, a transmission, etc. (not shown in detail). With this arrangement, the low speed rotating assembly 50 and its LPT rotor 42 may rotate at a different (e.g., faster) rotational velocity than the propulsor rotating assembly 46 and its propulsor rotor 38. However, it is contemplated the propulsor rotor 38 may alternatively be coupled to the low speed rotating assembly 50 and its LPT rotor 42 without the geartrain 52 such that the LPT rotor 42 may directly drive rotation of the propulsor rotor 38 through a shaft (e.g., the low speed shaft 48) or a shaft assembly.

The HPC rotor 40 is coupled to and rotatable with the HPT rotor 41, and the HPC rotor 40 is coupled or connected to the HPT rotor 41 through a high speed shaft 54. At least (or only) the HPC rotor 40, the HPT rotor 41 and the high speed shaft 54 collectively form a high speed rotating assembly 56; e.g., a high speed spool of the gas generator 36. This high speed rotating assembly 56 of FIG. 1 and its members 40, 41 and 54 are rotatable about the axis 22; however, it is contemplated the high speed rotating assembly 56 may alternatively be rotatable about another axis radially and/or angularly offset from the axis 22.

The engine sections 31A, 31B, 32, 33A and 33B may be arranged sequentially along the axis 22 and are housed within a stationary housing 58 of the aircraft propulsion system 20. This propulsion system housing 58 includes a gas generator case 60 (e.g., a core case) and a nacelle 62. The generator case 60 houses one or more of the propulsion system sections 31A, 31B, 32, 33A and 33B; e.g., the gas generator 36. The generator case 60 is shown extending axially along (e.g., axially overlapping) and extending circumferentially about (e.g., circumscribes) the engine sections 31A, 31B, 32, 33A and 33B and their respective bladed rotors 39-42. The generator case 60 may also house the geartrain 52. The nacelle 62 houses and provides an aerodynamic cover over the generator case 60. An exterior wall 64 of the nacelle 62 is disposed radially outboard of, extends axially along (e.g., axially overlaps) and extends circumferentially about (e.g., circumscribes) the gas generator 36 and its generator case 60. With this arrangement, the bladed rotors 39-42 are disposed within the propulsion system housing 58. The propulsor rotor 38 is disposed at least partially (or completely) outside of the propulsion system housing 58.

During operation of the aircraft propulsion system 20, ambient air within the external environment 28 is propelled by the propulsor rotor 38 in an aft, downstream direction towards the propulsion system downstream end 26. A major portion (e.g., more than 50%) of this air bypasses the gas generator 36 to provide forward thrust while a minor portion (e.g., less than 50%) of the air flows into the gas generator 36. An outer stream of the air propelled by the propulsor rotor 38, for example, flows axially across a guide vane structure 66 of the propulsion section 30 and outside of the propulsion system housing 58 (along the nacelle wall 64). The guide vane structure 66 is configured to condition (e.g., turn, straighten out) the air propelled by the propulsor rotor 38, for example, to remove or reduce circumferential swirl and thereby enhance the forward thrust. As will be appreciated, the terms "guide vane" and "stator" are utilized interchangeably herein and refer to the same component or structure.

An inner stream of the air propelled by the propulsor rotor 38 flows through an airflow inlet 68 of a core flowpath 70 into the aircraft propulsion system 20 and its gas generator 36. The core flowpath 70 extends sequentially through the LPC section 31A, the HPC section 31B, the combustor section 32, the HPT section 33A and the LPT section 33B from the core inlet 68 to a combustion products exhaust 72 from the core flowpath 70 into the external environment 28. The air entering the core flowpath 70 may be referred to as "core air."

The core air is compressed in various stages by the LPC rotor 39 and the HPC rotor 40 and directed into a combustion chamber 74 (e.g., an annular combustion chamber) of a combustor (e.g., an annular combustor) in the combustor section 32. Fuel is injected into the combustion chamber 74 and mixed with the compressed core air to provide a fuel-air mixture. This fuel-air mixture is ignited and combustion products thereof flow through and sequentially drive rotation of the HPT rotor 41 and the LPT rotor 42. The rotation of the HPT rotor 41 and the LPT rotor 42 respectively drive rotation of the HPC rotor 40 and the LPC rotor 39 and, thus, compression of the air received from the core inlet 68. The rotation of the LPT rotor 42 also drives rotation of the propulsor rotor 38 through the geartrain 52. The rotation of the propulsor rotor 38, in turn, propels the ambient air within the external environment 28 in the aft, downstream direction. With this arrangement, the gas generator 36 powers operation of (e.g., drives rotation of) the propulsor rotor 38 during aircraft propulsion system operation.

Still referring to FIG. 1, the propulsor rotor 38 includes a propulsor rotor base 76 (e.g., a disk or a hub) and a plurality of open propulsor blades 78 (e.g., airfoils). The propulsor blades 78 are arranged circumferentially about the rotor base 76 and the axis 22 in an array; e.g., a circular array. Each of the propulsor blades 78 is connected to (e.g., formed integral with or otherwise attached to) the rotor base 76.

The guide vane structure 66 includes a plurality of open exit guide vanes 100 (e.g., stators) arranged circumferentially about the axis 22 in an array; e.g., a circular array. This guide vane structure 66 and its guide vanes/stators 100 are arranged axially next to (e.g., adjacent) the propulsor rotor 38 and its propulsor blades 78. The guide vane structure 66 and the stators 100 are arranged downstream of the propulsor rotor 38 and its propulsor blades 78, without other element(s) axially therebetween to obstruct, turn and/or otherwise influence the air propelled by the propulsor rotor 38 to the guide vane structure 66. Each of the stators 100 is connected to a support structure 102 of the propulsion system housing 58. This support structure 102 may be a support frame, a case or another fixed structure of the propulsion system housing 58.

In FIG. 1, the propulsion section 30 is described above with a tractor or forward configuration; e.g., where the propulsor rotor 38 is disposed at or otherwise near the propulsion system upstream end 24 (sometimes referred to as a "puller" configuration). It is contemplated, however, the propulsion section 30 may alternatively be disposed at or otherwise near the propulsion system downstream end 26 (sometimes referred to as a "pusher" configuration). It is also contemplated the propulsion section 30 and its guide vane structure 66 may alternatively be used with other types of propulsion systems such as, for example, a turbofan or other ducted propulsion system. Moreover, while the gas generator 36 is described above with a forward flow configuration, it is contemplated the gas generator 36 may alternatively be configured with a reverse flow configuration where the turbine section 33 is located forward of the combustor section 32.

It has been determined that in certain applications, the added weight and complexity that results from implementing prior art variable geometry (e.g., pitch, camber, etc.) functionality for the guide vanes/stators in an open rotor configuration (also having variable geometry or pitch rotor blades) may outweigh the benefits obtained. In other words, the benefit of added thrust recovery resulting from the utilization of prior art systems implementing variable geometry stators may be less than the costs incurred by the added complexity and weight of such systems which are necessary to adjust the stators during flight. In such situations, performance may be increased by utilization of fixed stator configurations. For example, in one embodiment, fixed stators (as described herein) are combined with a variable rotor (variable geometry or pitch angles of the open rotor blades) to remove a substantial amount of swirl downstream.

The desired fixed stator geometry (e.g., pitch, camber, etc.) may be determined without undue experimentation from mission fuel burn analyses for different flight design missions. Performance during different types of flight missions may be improved when a particular given fixed stator geometry/pitch is utilized for a specific type of flight mission. For example, in a flight mission involving mostly take-off (ascent) time and little cruise time, a particular fixed stator geometry can be used to improved performance. Similarly, in a flight mission involving mostly cruising time and short take-off (ascent) and landing (descent), a different fixed stator geometry can be used to improved performance.

Each stator 100 is mounted to the propulsion system housing 58 in a "fixed" manner and the geometry (e.g., pitch, camber, etc.) of the stators 100 is otherwise "fixed." For purposes of this disclosure, the term "fixed" is used in describing the attachment or mounting of the stators 100 to the engine housing herein, means that the geometry (e.g., pitch, camber, etc.) of the stators 100 are non-adjustable by a controller (e.g., by a pilot, electronic control system, etc.) during flight. In other words, the guide vanes are set in a fixed position and immovable for the full duration of the flight. As a result, each of the stators 100 are fixed in a static position and remain in that geometry throughout the flight mission (i.e., taxiing from gate, take-off, cruise, descent, and taxiing to gate). The geometry (e.g., pitch, camber, etc.) of the stators 100 may all be the same, may all be different, or may include various combinations of geometries (or positions). For example, during a flight mission, the pitch angle of each stator may be the same as each other or some may be different from others.

Although the stators 100 of the present disclosure are fixed, the geometry (e.g., pitch, camber, etc.) of a stator 100 may be manually adjusted by ground personnel before and after a flight. Ground personnel may include ground personnel at the gate between flights, personnel servicing the aircraft/propulsion system during minimal maintenance periods (e.g., overnight or a short maintenance duration longer than between back-to-back flights) or during extended maintenance (e.g., during a major aircraft check and/or propulsion system heavy maintenance with the propulsion system off wing). The stators 100 are each configured in a fixed geometry (and thus a fixed position on the aircraft) during a given flight, and the stators (one, a few or all) can be adjusted as desired into a different fixed geometry/position for a different flight. Such manual adjustment of the stator geometry (e.g., pitch, camber, etc.) while on the ground prior to a flight can be implemented in order to optimize or increase performance. In another embodiment, manual adjustment may consist of swapping a set (or partial set) of guide vanes with a given geometry (e.g., pitch, camber, etc.) for a different set (or partial set) with a different geometry. In this embodiment, the structure is fixed on the propulsion system housing 58 (or the wing in some embodiments) without adjustability and the ground adjustment may be accomplished by removing one or more stators 100 and installing replacements with different geometry (resulting in a comparatively different configuration or position). Examples of manually adjusting the fixed stators (from one position to another position) described herein include adjusting the geometry (e.g., pitch, camber, etc.) of the stators 100 currently mounted to the engine, as well as replacing one or more of the currently mounted stators 100 with one or more other stators having a different and predetermined geometry.

Figure 2:
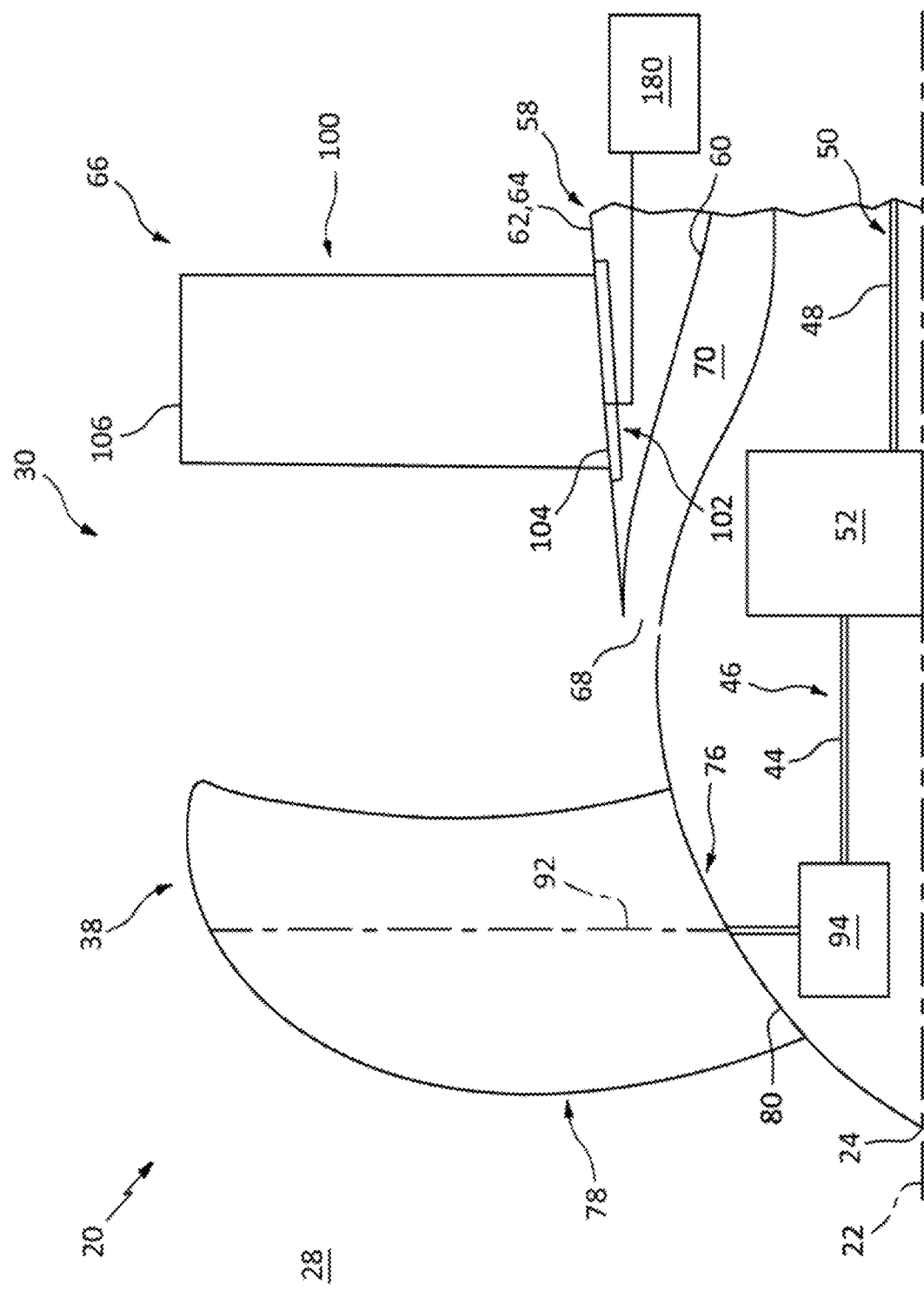
FIG. 2 illustrates a partial schematic illustration or block diagram of the aircraft propulsion system at the propulsion section having fixed stators/vanes with manual adjustment.

Turning to FIG. 2, a variable geometry adjustment structure or mechanism 180 (not shown in FIG. 1) is shown coupled to the plurality of guide vanes 66 and configured to vary the geometry (e.g., pitch, camber, etc.) of the stators 100. In one embodiment, the mechanism 180 may be a component coupled to, or part of, the support structure 102 and connects the stators 100 to the support structure 102 (or to components 62, 64). The mechanism 180 is structured to be manually adjusted or activated by a human, such as one or more ground personnel. As will be appreciated, the mechanism 180 does not include the conventional variable geometry mechanisms for rotor/stator blades and actuation systems which have typically been included and which function by pilot control (in cockpit) during flight or other aircraft engine or component controller, electrical or mechanical, during flight. Instead, the present disclosure and mechanism 180 includes an assembly or structure positioned at or close to the guide vane structure 66 and stators 100 that is manually activated by a human (by hand or other tool), such as a crank and gear(s) that move or adjust the position of the stators 100.

Each stator 100 extends spanwise from the housing exterior surface 104 to the respective stator tip 106. Other physical configurations and shapes for the stators 100 may be utilized as desired. In embodiments, the stators 100 may be configured as described in U.S. patent application Ser. No. 18/431,050 filed on Feb. 2, 2024, which application is incorporated herein by reference, to enable geometry (pitch angle, camber, etc.) adjustment by the variable geometry adjustment structure or mechanism 180.

It will be understood that mechanism 180 could be implemented as a single assembly that collectively adjusts the geometry (e.g., pitch, camber, etc.) of all the stators 100, or in another embodiment, there could be multiple mechanisms 180, e.g., one each for each stator, which would allow for independent adjustment of each individual stator 100.

Now turning to FIGS. 3 and 3A (a cross-section along A-A), there is shown a partial schematic diagram illustrating one example of the variable geometry adjustment structure or mechanism 180 coupled to the guide vanes 66 and configured to control and vary the geometry of the stators 100. The mechanism 180 includes, in one embodiment, a trunnion 182 disposed at or connected to the support structure 102 and/or engine housing and coupled to the proximal end of the stator 100. This provides a rotation capability to the stator 100 and enable changes in its geometry, such as pitch angle. The mechanism 180 further includes a gear assembly 184 coupled to the trunnion 182 which is configured to engage with an actuation ring 186 (e.g., full hoop) supported by an actuation ring support 188. As the actuation ring 186 moves, the gear assembly 184 rotates, which in turn causes the trunnion 182 to rotate-adjusting the geometry, such as pitch angle, of the stator 100. It will be understood that any suitable devices and components may be used to provide the described functionality of the mechanism 180.

Although not shown, a manual locking mechanism may be coupled to the actuation ring 186 to manually lock the actuation ring 186—preventing its movement. To implement a different geometry, a ground personnel manually disengages the locking mechanism, adjusts the actuation ring 186 to a different and desired position (thus adjusting the geometry/pitch angle of the stator 100) and manually engages the locking mechanism.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An assembly for an aircraft propulsion system, the assembly comprising:
   a propulsor rotor configured to rotate about an axis;
   a guide vane structure disposed axially next to and downstream of the propulsor rotor and comprising a plurality of guide vanes arranged circumferentially about the axis; and
   a manually activated variable geometry adjustment structure coupled to the plurality of guide vanes and configured to vary each of the plurality of guide vanes between a first fixed geometry such that each of the plurality of guide vanes are immovable during a full duration of a first flight and a second fixed geometry such that each of the plurality of guide vanes are immovable during a full duration of a second flight,
   wherein the manually activated variable geometry adjustment structure comprises:
      at least one trunnion disposed at or connected to a support structure of a propulsion system housing or an engine housing of the aircraft propulsion system and coupled to a proximal end of each of the plurality of guide vanes; and
      a gear assembly coupled to the trunnion, the gear assembly configured to engage with an actuation ring, wherein, as the actuation ring moves, the gear assembly rotates, which in turn causes the trunnion to rotate to vary at least one of the plurality of guide vanes between the first fixed geometry and the second fixed geometry.

2. The assembly of claim 1, wherein:
   each of the plurality of guide vanes are manually adjustable between the first fixed geometry and the second fixed geometry by ground personnel.

3. The assembly of claim 2, wherein:
   the first fixed geometry includes at least one of a first pitch angle that is different from a second pitch angle of the second fixed geometry.

4. The assembly of claim 2, wherein the actuation ring is supported by an actuation ring support.

5. The assembly of claim 1, wherein:
   each of the plurality of guide vanes is configured to be manually adjustable between the first fixed geometry and the second fixed geometry only by ground personnel.

6. The assembly of claim 5, wherein:
   the propulsor rotor comprises an open propulsor rotor and comprises a plurality of variable pitch rotor blades; and
   the guide vane structure comprises an open guide vane structure.

7. The assembly of claim 1, further comprising:
   a manually activated variable geometry adjustment structure coupled to the plurality of guide vanes and configured to vary each of the plurality of guide vanes between the first fixed geometry and the second fixed geometry only when the assembly is stationary.

8. The assembly of claim 1, further comprising:
   a variable geometry adjustment structure coupled to the plurality of guide vanes and configured to be incapable of varying the plurality of guide vanes between the first fixed geometry and the second fixed geometry during the first flight or the second flight.

9. A method of adjusting a guide vane structure in an aircraft propulsion system, the guide vane structure disposed axially next to and downstream of a propulsor rotor and comprising a plurality of guide vanes each having a first fixed geometry incapable of adjustment during flight, the method comprising:
   adjusting at least one of the plurality of guide vanes from the first fixed geometry to a second fixed geometry including:
   manually activating a variable geometry adjustment structure coupled to the plurality of guide vanes to adjust each of the plurality of guide vanes from the first fixed geometry to the second fixed geometry, wherein the manually activated variable geometry adjustment structure comprises:
      at least one trunnion disposed at or connected to a support structure of a propulsion system housing or an engine housing of the aircraft propulsion system and coupled to a proximal end of each of the plurality of guide vanes; and
      a gear assembly coupled to the trunnion, wherein the gear assembly engages with an actuation ring, wherein, as the actuation ring moves, the gear assembly rotates, which in turn causes the trunnion to rotate to vary at least one of the plurality of guide vanes between the first fixed geometry and the second fixed geometry.

10. The method of claim 9, further comprising:
    manually adjusting, by ground personnel, each of the plurality of guide vanes from the first fixed geometry to the second fixed geometry.

11. The method of claim 10, wherein the aircraft propulsion system comprises an open propulsor rotor and the guide vane structure comprises an open guide vane structure.

* * * * *